United States Patent [19]

Park et al.

[11] Patent Number: 5,731,375
[45] Date of Patent: Mar. 24, 1998

[54] POLYAMIDE RESIN COMPOSITIONS

[75] Inventors: Bong Hyun Park; Jin Soo Kim, both of Yangchung-dong; Sahng Ho Song; Jong Su Lee, both of Hoge-dong, all of Rep. of Korea

[73] Assignees: Hyundai Motor Company; Tongyang Nylon Co., Ltd., both of Seoul, Rep. of Korea

[21] Appl. No.: 522,560

[22] Filed: Sep. 1, 1995

[30] Foreign Application Priority Data

Sep. 5, 1994 [KR] Rep. of Korea ............... 94-22249

[51] Int. Cl.$^6$ ................................ C08J 3/38
[52] U.S. Cl. .................. 524/405; 524/413; 524/447; 524/449; 524/456; 524/492; 524/494
[58] Field of Search .................. 524/405, 492, 524/494

[56] References Cited

U.S. PATENT DOCUMENTS

| | | | |
|---|---|---|---|
| 4,079,850 | 3/1978 | Suzuki et al. | 215/1 C |
| 4,427,825 | 1/1984 | Degrassi et al. | 525/56 |
| 4,500,677 | 2/1985 | Maruhashi et al. | 525/57 |
| 4,952,628 | 8/1990 | Blatz | 525/58 |

FOREIGN PATENT DOCUMENTS

| | | |
|---|---|---|
| 3-177 454 | 8/1991 | Japan . |
| 6-234 896 | 8/1994 | Japan . |

*Primary Examiner*—Ana Woodward
*Attorney, Agent, or Firm*—Finnegan, Henderson, Farabow, Garrett & Dunner, L.L.P.

[57] ABSTRACT

This invention relates to polyamide resin compositions for interior or exterior parts of automobile, more particularly, to polyamide resin compositions showing excellent dimension stability, several good mechanical properties and good plasticity, which are prepared by mixing polyamide-6 resin, polyamide-66 resin, or copolymerized polyamide 66 resin blended with polyamide-6 or polyamide-66 resin, with filler such as fibroid glass fiber, ethylene-vinyl-alcohol copolymer resin and other additives.

6 Claims, No Drawings

POLYAMIDE RESIN COMPOSITIONS

FIELD OF THE INVENTION

This invention relates to polyamide resin compositions for interior or exterior parts of automobiles. More particularly, the invention relates to polyamide resin compositions showing excellent dimension stability, several good mechanical properties and good plasticity et al., which are prepared by mixing copolymerized polyamide resin with polyamide-6 or polyamide-66 resin, fillers such as fibroid glass fiber, ethylene-vinyl-alcohol copolymer resin and other additives.

BACKGROUND OF THE INVENTION

Currently metal has been used as material of interior or exterior parts of automobile. However, use of plastic product is accelerated because of the objective of improving fuel ratio by lightening the weight of automobile body, improving the degree of freedom of design, curtailing some unnecessary manufacturing process and its expenditure.

Especially, excellent mechanical properties(strength and rigidity), good damping properties, excellent dimension, stability, good paintability and surface smoothness capacity of formed product are generally required or relatively heavy formed parts such as outside mirror base plate and frame of automobile.

To satisfy these properties, metal materials such as aluminium and zinc diecasting et al. have been used up to now.

These metal materials have an excellent damping property and mechanic properties(strength and rigidity), but have faults such as complexity of painting process, difficulty of surface treatment before painting process. Furthermore, metal materials' heavy weight prevents the improvement of fuel ratio.

Therefore, cheap and lightweight plastic material with good plasticity etc. is urgently required.

Glass fiber-reinforced polyamide resins generally have good mechanical properties(strength and rigidity) but have poor paintability and surface smoothness characteristics. Glass fiber with high percentage content must be used to acquire good mechanical properties (strength and rigidity), but it results in faults such as bad extruding capacity and bad surface smoothness capacity for injection moulding.

Japanese non-examined publication No. pyong 4-370148 discloses polyamide resin compositions with improved outside view. These resin compositions have good surface smoothness capacity but its mechanical properties (strength and rigidity) are poor. Resin compositions produced by adding fibroid glass fiber to copolymer by grafting polyester resin with aliphatic polycarbonate and butadiene series compounds are disclosed. These compositions also have bad mechanical properties, paintability and plasticity etc. Japanese non-examined publication No. sho 63-33471 discloses transformed polyphenylene eter resin compositions acquired by reacting polyphenylene eter with substituted olefin compound, but these compositions also have several bad properties.

Japanese non-examined publication No. pyong 3-50263 discloses resin compositions produced by reacting polyamide resin with transformed polyolefin and reinforced, material etc, but these compositions don't have sufficient mechanical properties(strength and rigidity).

Therefore, the inventors made an effort to solve these problems of the prior technology, and as a result, developed the compositions of this invention which show several excellent mechanical properties, thermal resistance and plasticity etc. These compositions are prepared by mixing definite polyamide 6, 66 resin and their copolymer with filler such as fibroid glass fiber, ethylene-vinyl-alcohol copolymer resin and other additives.

SUMMARY OF THE INVENTION

An object of this invention is to provide polyamide resin compositions for an automobile exterior or interior, showing several excellent mechanical properties, comprised of polyamide resin, filler, ethylene-vinyl-alcohol copolymer resin and other additives.

It is to be understood that both the foregoing general description and the following detailed description am exemplary and explanatory and am intended to provide further explanation of the invention as claimed.

DETAILED DESCRIPTION OF THE INVENTION

The polyamide resin compositions of this invention comprise: (a) 30 to 70 wt % of a compound selected from the group consisting of polyamide-6 the following formula(I), polyamide -66 of the following formula(II), polyamide colpolymer of the following formula(III) (which is a copolymer of the above polyamide-6 with the above polyamide-66), and blended polyamide which is prepared by mixing the above polyamide copolymer(III) with 10 to 50 wt % of the above polyamide-6 or polyamide-66; (b) 10 to 70 wt % of filler; and (c) 0.5 to 30 wt % of ethylene-vinyl-alcohol copolymer.

(I)

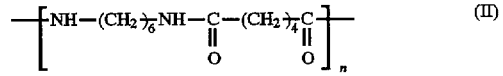
(II)

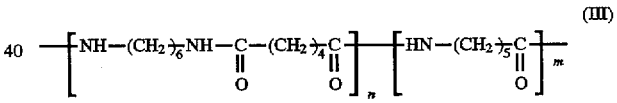
(III)

wherein, n is an integer ranging from 200 to 500, m is an integer ranging from 50 to 100.

The polyamide resin used as the primary ingredient in this invention is used in 30 to 70 wt % of the total compositions.

Wherein, the resin of formula(I) is prepared by ring opening polymerization of ε-caprolactam et al. and the resin of formula(II) may be prepared by condensation of hexamethylendiamine and adipic acid.

When the content of polyamide is less than 30 wt %, normal pellet is not formed due to poor extruding capacity and even though pellet is formed, its paintability is poor because its injection moulding capacity and surface smoothness capacity is poor; when the content exceeds 70 wt %, mechanical properties such as strength and rigidity et al. and damping capacity are reduced.

Among the resins of the said formula (I), (II) and (III), the used ones have relative viscosity of 2.0 to 3.0 (measured at 23° C., in 1 g polymer solution of 100 ml of 96% conc. $H_2SO_4$). When the relative viscosity is less than 2.0, mechanical properties are reduced; when exceeds 3.0, plasticity and surface smoothness capacity are poor. In order to reinforce mechanical strength and rigidity in this invention, filler selected from the group consisting of (1) fibroid glass fiber (2) fibroid globular glass or flaky glass (3)aluminium borate whisker ($9Al_2O_3 \cdot 2B_2O_3$) (4) fibroid potassium titanate ($K_2O \cdot 8TiO_2$) (5)mica (6) inorganic reinforcing material such as wollastonite ($CaSiO_2$), Kaolin, carbon fiber and alumina is used.

When the content of filler is less than 10wt %, mechanical properties such as strength and rigidity, damping property and dimension stability am reduced; when exceeding 70 wt %, extruding workability, is difficult and paintability is poor due to bad surface smoothness capacity:

When the above mentioned fibroid glass fiber is used, it is treated with surface coupling agent such as aminosilane series, epoxy series or titanate et al. in order to improve mechanical properties by having good adhesion with polyamide resin. The fibroid glass fiber is an average of 3~5 mm of length, and averages 9~13 µm in diameter.

When the average length is less than 3 mm, improvement of mechanical properties is poor; when exceeding 5 mm, extruding workability, plasticity and surface smoothness capacity are poor.

When said fibroid globular glass or flaky glass is used, the average diameter less than 10 µm.

It is preferable to use aluminium borate whisker of average length 10~30 µm and average diameter less than 1 µm; fibroid potassium titanate ($K_2O \cdot 8TiO_2$) of average length 10 µm and average diameter less than 1 µm.

Mica such as gold mica, white mica or black mica can be used, preferably with average lengths 50~300 µm and average diameters 20~50 µm.

In this invention, to improve paintability, 0.5 to 30 wt % of ethylene-vinyl-alcohol copolymer resin is used.

When the content of resin is less than 0.5 wt %, painting-tighted capacity is poor; when exceeding 30 wt %, plasticity, mechanical properties and thermal endurance are bad.

The content of ethylene group in the said copolymer molecule is preferably 30 to 40 mol %. When the content is less than 30 mol %, thermal endurance goes down; when exceeding 40 mol %, improvement effect of paintability is decreased.

In addition to the above ingredients, if necessary, plastic workability stabilizing agent, dispersing agent or thermal endurance stabilizing agent, antioxidant of aromatic amine series, hindered phenolic series, phosphorus series or sulfur series, carbon black or other resin additives are used in the range of 0.1 to 10 wt %.

The polyamide resin compositions of this invention have particular advantages in that it has good mechanical properties(strength and rigidity), damping property, dimension stability, paintability, surface smoothness capacity and plasticity et al. In particular, because the above mechanical properties such as tensile strength, flexural strength, impact strength or thermal deformation temperature et al. are excellent, the inventive polyamide resin compositions may be most effectively and widely used in interior or exterior plastic parts of automobiles, and may be substituted for metal parts applied to outside mirror base plate and frame et al.

Hereafter, the present invention is described in more detail in the following examples but the invention is not confined to the examples.

First of all, after the compositions prepared by examples and comparative examples were mixed well in a tumbler mixer, and pellets were made by a single or twin screw extruder at 270° to 290° C. of cylinder temp. Plastic workability stabilizing agent, antioxidant, carbon black, dispersing agent or lubricant is added within range of this invention to the example and comparative compositions. The above pellets were dried under nitrogen atmosphere at 90°~100° C. for 8 hours. The test specimens were manufactured by an injection method(molding temp: 270°~300° C., metal mold temp.: 120° C.). The test specimen manufactured is evaluated by the following method.

(1) mechanical properties(Strength and rigidity)

| Evaluation Item | Evaluation Method |
| --- | --- |
| tensile strength | ASTM D-638 |
| flexural strength | ASTM D-790 |
| flexural modulus | ASTM D-790 |
| impact strength (Notch) | ASTM D-256 |

(2) The damping property is closely related with flexural elasticity rate.

The greater flexural elasticity rate is, the more excellent damping property is. Therefore, the damping property is described according to 1~16 of flexural elasticity rate value evaluated by the above (1).

(3) Paintability(painting-tighted property)

Test specimens each 100 mm in width and in length, 3 mm thickness, were washed with alcohol, painted to a 50 µm paint thickness with acrylic urethane resin paint, were hardened at 80° C. for 30 minutes. 100 units of 1 mm×1 mm square, were crossed batched on the surface of test specimens painted, hereinafter, cellulose adhesive tape was attached on the surface, and when the tape was stripped off, the appearance of fragment separated was observed. The painting-lighted property was evaluated by the number of separated fragment. This evaluation was carried out by two methods of normal temperature and after soaking in water of 40° C. for 10 days.

(4) Surface smoothness capacity

① sensuous evaluation(examination with the naked eye)
This test was carried out by observation with naked eye on the above ASTM tensile specimens.
  o: good(no crack)
  △: average(a few cracks)
  ×: poor(many cracks)

② measurement of surface roughness
  "Surface roughness" of the central part of the above ASTM tensile specimens was measured. Surface smoothness capacity was evaluated by average surface roughness.

The lower surface roughness is, the more excellent surface smoothness capacity is.

EXAMPLE 1

In accordance with the blending ratio shown in the following Table 1, 37 wt % of polyamide 6(Tongyang Nylon Co. Ltd., TOPLAMID 1011®) pellets having a relative viscosity of 25 (23° C., 1 g polymer solution in 100 ml of 96% conc. $H_2SO_4$) and 220° C. of melting temperature were added to 60 wt % of fibroid glass fiber having 3 mm of average length, treated with surface coupling agent, and 3 wt % of ethylene-vinyl-alcohol colpolymer resin.

The pellets were manufactured and dried through mixing and extruding of the prepared compositions. The test specimens were manufactured by an injection method. The results of several properties are shown in the following Table 2.

EXAMPLE 2

Using 37 wt % of polyamide 66(Tongyang Nylon Co., LTD., TOPLAMID 2011®) pellets having a relative viscosity of 2.6° and 260° C. of melting temperature and 60 wt % of fibroid glass fiber having 3 mm of average length, treated with surface coupling agent, the compositions, pellets and test specimens were manufactured according to Example 1.

The results of several properties are shown in the following Table 2.

EXAMPLE 3

Using 37 wt % of polyamide copolymer (prepared by copolymerizing polyamide 66 of Example 2 with ε-caprolactam is less than 10 wt %, plasticity, surface smoothness capacity and paintability et al. is poor; when exceeding 15 wt %, mechanical properties and plasticity et al. is reduced), the compositions, pellets and test specimens were manufactured according to Example 1.

The results of several properties are shown in the following Table 2.

EXAMPLE 4

37 wt % of polyamide 66 pellet having a relative viscosity of 2.6° and 260° C. of melting temperature, 45 wt % of fibroid glass fiber having 3 mm of average length treated with surface coupling agent, 15 wt % of aluminium borate whisker having 1 μm of average diameter, treated with surface coupling agent, and 3 wt % of ethylene-vinyl-alcohol copolymer were mixed. According to the above method, pellets and test specimens were manufactured. The results of several properties are shown in the following Table 2.

EXAMPLE 5

Using 37 wt % of polyamide copolymer having a relative viscosity of 2.5° and 230° C. of melting temperature, the test specimens were manufactured according to Example 4. The results of several properties are shown in the following table 2.

EXAMPLE 6

Besides using of 25 wt % of polyamide copolymer of Example 3 and 12 wt % of polyamide 6 of Example 1, the test specimens were manufactured according to Example 4. The results of several properties are shown in the following Table 2.

EXAMPLE 7

Using 37 wt % of polyamide copolymer of Example 3 and 15 wt % of fibroid potassium titanate having 0.5 μm of average diameter, treated with surface coupling agent, the test specimens were manufactured according to Example 4. The results of several properties are shown in the following Table 2.

EXAMPLE 8

Using mica having 200 μm average length treated with surface coupling agent instead of fibroid potassium titanate, the test specimens were manufactured according to Example 7. The results of several properties are shown in the following Table 2.

EXAMPLE 9

Using needle-shaped wollastonite having 200 μm of average length, treated with surface coupling agent instead of fibroid potassium titanate, the test specimens were manufactured according to Example 7. The results of several properties are shown in the following Table 2.

EXAMPLE 10

Using polyamide copolymer of Example 3, the test specimens were manufactured according to Example 8. The results of several properties are shown in the following Table 2.

EXAMPLE 11

Using polyamide 65 of Example 2, the test specimens were manufactured according to Example 9. The results of several properties are shown in the following Table 2.

Comparative Example 1

In accordance with Table 1, 40 wt % of polyamide 5 pellets having a relative viscosity of 2.5(23° C., 1 g polymer solution is 100 ml of 95% conc. $H_2SO_4$) and 60 wt % of fibroid glass fiber having 3 mm of average length, treated with surface coupling agent were mixed. According to the above method, pellets and test specimens were manufactured. The results of several properties are shown in the following Table 2, compared with Examples.

Comparative Example 2

Using polyamide copolymer(prepared by copolymerizing polyamide 66 of Example 2 with ε-caprolactam is less than 10 wt %, plasticity, surface smoothness capacity and paintability et al. is poor; when exceeding 15 wt %, mechanical properties and plasticity et al. is reduced) having or relative viscosity of 2.5° and 230° C. of melting temperature, the test specimens were manufactured according to Example 3. The results of several properties are shown in the following Table 2, compared with Examples.

Comparative Example 3

Using 72 wt % of polyamide 66 pellets having a relative viscosity of 2.6° and 260° of melting temperature and 25 wt % of fibroid glass fiber having 3 mm of average length, treated with surface coupling agent, the test specimens were manufactured according to Example 3. The results of several properties are shown in the following Table 2, compared with Examples.

Comparative Example 4

50 wt % of polyamide copolymer of Example 3, 45 wt % of fibroid glass fiber having 3 mm of average length, treated with surface coupling agent, and 5 wt % of fibroid potassium titanate having 10 μm of average length and 0.5 μm of average diameter were mixed. The results of several properties are shown in the following Table 2, compared with Examples.

Comparative Example 5

The test specimens were manufactured according to Example 5 but without ethylene-vinyl-alcohol resin. The results of several properties are shown in the following Table 2, compared with Examples.

TABLE 1

(unit: wt %)

| Ingredient | Example 1 | 2 | 3 | 4 | 5 | 6 | 7 | 8 | 9 | 10 | 11 | Comparative Example 1 | 2 | 3 | 4 | 5 |
|---|---|---|---|---|---|---|---|---|---|---|---|---|---|---|---|---|
| polyamide 6 | 37 | — | — | — | — | 12 | — | — | — | 37 | — | 40 | — | — | — | — |
| polyamide 66 | — | 37 | — | 37 | — | — | — | — | — | — | 37 | — | — | 72 | — | — |
| polyamide Relative Viscosity 2.5 | — | — | 37 | — | 37 | 25 | 37 | 37 | 37 | — | — | — | — | — | 50 | 37 |
| copolymer Relative Viscosity 3.2 | — | — | — | — | — | — | — | — | — | — | — | — | 37 | — | — | — |
| fibroid glass fiber | 60 | 60 | 60 | 45 | 45 | 45 | 45 | 45 | 45 | 45 | 45 | 60 | 60 | 25 | 45 | 45 |
| aluminium borate whisker | — | — | — | 15 | 15 | 15 | — | — | — | — | — | — | — | — | — | 15 |
| fibroid potassium titanate | — | — | — | — | — | — | 15 | — | — | — | — | — | — | — | 5 | — |
| mica | — | — | — | — | — | — | — | 15 | — | 15 | — | — | — | — | — | — |
| wallastonite | — | — | — | — | — | — | — | — | 15 | — | 15 | — | — | — | — | — |
| ethylene-vinyl-alcohol copolymer resin | 3 | 3 | 3 | 3 | 3 | 3 | 3 | 3 | 3 | 3 | 3 | — | 3 | 3 | — | — |

TABLE 2

| Property Item | Tensile strength (Kgf/cm²) | Flexural strength (Kgf/cm²) | Flexural modulus (Kgf/cm²) | Impact strength[1] (Notch) (Kgf-cm/cm) | Damping property ranking | Paintability[2] Normal temp. | Paintability[2] After soaking in warm water | Surface smoothness property Physical function | Surface smoothness property Surface roughness[3] (μm) |
|---|---|---|---|---|---|---|---|---|---|
| Example 1 | 2,300 | 3,000 | 170,200 | 20.0 | 5 | 4 | 7 | Δ | 0.71 |
| Example 2 | 2,400 | 3,200 | 175,000 | 16.0 | 1 | 4 | 6 | Δ | 0.78 |
| Example 3 | 2,300 | 3,100 | 172,100 | 19.0 | 4 | 3 | 4 | Δ | 0.67 |
| Example 4 | 2,100 | 2,800 | 173,200 | 14.0 | 2 | 0 | 0 | Δ | 0.37 |
| Example 5 | 2,050 | 2,700 | 169,260 | 15.0 | 6 | 0 | 0 | o | 0.18 |
| Example 6 | 2,100 | 2,700 | 164,320 | 14.3 | 9 | 0 | 0 | o | 0.14 |
| Example 7 | 2,200 | 2,900 | 172,800 | 16.4 | 3 | 0 | 0 | o | 0.16 |
| Example 8 | 1,700 | 2,400 | 154,500 | 13.2 | 13 | 0 | 1 | Δ | 0.62 |
| Example 9 | 1,900 | 2,700 | 163,000 | 14.5 | 10 | 1 | 3 | Δ | 0.41 |
| Example 10 | 1,840 | 2,570 | 156,000 | 13.8 | 12 | 1 | 2 | Δ | 0.74 |
| Example 11 | 1,980 | 2,790 | 166,600 | 14.1 | 7 | 2 | 3 | Δ | 0.46 |
| Comparative Example 1 | 2,250 | 3,100 | 165,000 | 17.8 | 8 | 24 | 36 | x | 0.98 |
| Comparative Example 2 | 2,000 | 2,900 | 152,300 | 15.0 | 14 | 11 | 15 | x | 0.99 |
| Comparative Example 3 | 1,500 | 2,200 | 79,100 | 9.2 | 16 | 3 | 5 | o | 0.07 |
| Comparative Example 4 | 1,950 | 2,600 | 130,200 | 12.4 | 15 | 22 | 29 | Δ | 0.45 |
| Comparative Example 5 | 2,100 | 2,800 | 158,300 | 14.9 | 11 | 38 | 54 | Δ | 0.63 |

Note:
[1] Thickness of test specimen: 6.4 mm
[2] The greater the number is, the poor paintability is.
[3] It represents as average luminous intensity(Ra). The greater the value is, the more excellent surface smoothness property is.

What is claimed is:

1. A polyamide automotive interior or exterior part resin composition comprising: (a) 30 to 70 wt % of a compound selected from the group consisting of polyamide-6 according to the following formula(I), polyamide-66 according to the following formula(II), polyamide copolymer 6–66 according to the following formula(III), and a polyamide blend which is prepared by mixing the polyamide copolymer 6–66 with 10 to 50 wt % of the polyamide-6 or polyamide-66; (b) 30 to 70 wt % of a filler wherein the filler is a mixture of fibroid glass fiber and aluminum borate whisker; and (c) 0.5 to 30 wt % of ethylene-vinyl-alcohol copolymer;

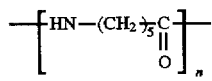
(I)

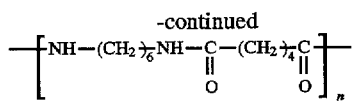
(II)

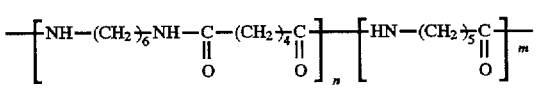
(III)

wherein n is an integer of 200 to 500, and m is an integer of 50 to 100, and all weight percentages are based on the total weight of the polyamide composition.

2. The polyamide resin composition as claimed in claim 1, wherein each of the polyamides or polyamide copolymers of the above formulas (I), (II), and (III) has a relative viscosity of 2.0 to 3.0 (23° C., in 1 g polymer solution of 100 ml of 96% conc. H2SO4).

3. The polyamide resin composition of claim 1, wherein the filler consists of a mixture of 60 to 70 wt % of fibroid glass fiber, and 40 to 30 wt % of aluminum borate whisker.

4. The polyamide resin compositions of claim 3, wherein the fibroid glass fiber has an average length of 3 to 5 mm, and an average diameter of 9 to 13 μm, and the aluminum borate whisker has an average length of 0.01 to 0.03 mm and an average diameter less than or equal to 1 μm.

5. The polyamide resin compositions of claim 1, wherein the fibroid glass fiber has an average length of 3 to 5 mm, and an average diameter of 9 to 13 μm, and the aluminum borate whisker has an average length of 0.01 to 0.03 mm and an average diameter less than or equal to 1 μm.

6. An automotive part comprising the composition of claim 1.

* * * * *

UNITED STATES PATENT AND TRADEMARK OFFICE
CERTIFICATE OF CORRECTION

PATENT NO. : 5,731,375
DATED : March 24, 1998
INVENTOR(S) : Bong Hyun Park et al.

It is certified that error appears in the above-indentified patent and that said Letters Patent is hereby corrected as shown below:

Abstract, Line 6, before "66" (second occurrence) insert -- — --.

Signed and Sealed this

Sixteenth Day of June, 1998

Attest:

BRUCE LEHMAN

Attesting Officer      Commissioner of Patents and Trademarks